(12) United States Patent
Depasquale et al.

(10) Patent No.: US 10,115,128 B2
(45) Date of Patent: Oct. 30, 2018

(54) METHOD AND SYSTEM FOR TARGETING MESSAGES TO TRAVELERS

(75) Inventors: Thomas Depasquale, Alexandria, VA (US); John Love, Woodinville, WA (US); Michael Lore, Vienna, VA (US); Michael Fredericks, Fairfax, VA (US); Andrew Csontos, Alexandria, VA (US)

(73) Assignee: CONCUR TECHNOLOGIES, INC., Redmond, WA (US)

( * ) Notice: Subject to any disclaimer, the term of this patent is extended or adjusted under 35 U.S.C. 154(b) by 0 days.

(21) Appl. No.: 13/277,916

(22) Filed: Oct. 20, 2011

(65) Prior Publication Data

US 2012/0101858 A1    Apr. 26, 2012

Related U.S. Application Data

(60) Provisional application No. 61/405,480, filed on Oct. 21, 2010, provisional application No. 61/405,488, filed on Oct. 21, 2010.

(51) Int. Cl.
*G06Q 30/00* (2012.01)
*G06Q 30/02* (2012.01)
(Continued)

(52) U.S. Cl.
CPC ......... *G06Q 30/0261* (2013.01); *G06Q 10/02* (2013.01); *G06Q 30/0205* (2013.01);
(Continued)

(58) Field of Classification Search
USPC ..................................................... 705/14.58
See application file for complete search history.

(56) References Cited

U.S. PATENT DOCUMENTS

| 2,910,238 A | 10/1959 | Miles et al. |
| 2,995,729 A | 8/1961 | Steele |

(Continued)

FOREIGN PATENT DOCUMENTS

| EP | 0762306 | 3/1997 |
| WO | WO 00/02152 | 1/2000 |
| WO | WO 01/61607 | 8/2001 |

OTHER PUBLICATIONS

"Thread: Pay Per Impression Programs", Digital Point Forums, Mar. 2005, found on line at forums.digitalpoint.com/showthread.php?t=12248.*

(Continued)

*Primary Examiner* — Kambiz Abdi
*Assistant Examiner* — Scott C Anderson
(74) *Attorney, Agent, or Firm* — DLA Piper LLP (US)

(57) ABSTRACT

Methods and Systems for Targeting Messages to a Traveler. Requests can be received to transmit messages to a traveler based on a location and a categorization of the traveler. A device location can be received. Location information of the traveler can be determined. Prior expense report information can be determined. Entity expense policy can be determined. The location information, the prior expense information, and the entity expense policy information can be categorized to generate a projected route. Updated device location can be received. It can be determined that the device is in a location corresponding to the projected location information based on the updated device location. Any targeted messages that have a category that matches a category for the location information, the prior expense information, and the policy information can be transmitted to a device of the traveler.

34 Claims, 3 Drawing Sheets

(51) Int. Cl.
*G06Q 10/02* (2012.01)
*H04W 4/21* (2018.01)
*H04W 4/02* (2018.01)
*H04W 4/06* (2009.01)

(52) U.S. Cl.
CPC ........ *G06Q 30/0271* (2013.01); *H04W 4/025* (2013.01); *H04W 4/06* (2013.01); *H04W 4/21* (2018.02); *H05K 999/99* (2013.01)

(56) References Cited

U.S. PATENT DOCUMENTS

| | | |
|---|---|---|
| 3,253,262 A | 5/1966 | Wilenitz et al. |
| 4,049,276 A | 9/1977 | Hole |
| 4,755,963 A | 7/1988 | Denker et al. |
| 4,775,936 A | 10/1988 | Jung |
| 4,845,625 A | 7/1989 | Stannard |
| 4,857,840 A | 8/1989 | Lanchais |
| 4,862,357 A | 8/1989 | Ahlstrom et al. |
| 4,931,932 A | 6/1990 | Dalnekoff et al. |
| 5,021,953 A | 6/1991 | Webber et al. |
| 5,148,365 A | 9/1992 | Dembo |
| 5,191,523 A | 3/1993 | Whitesage |
| 5,237,499 A | 8/1993 | Garback |
| 5,253,165 A | 10/1993 | Leiseca et al. |
| 5,253,166 A | 10/1993 | Dettelbach et al. |
| 5,255,184 A | 10/1993 | Hornick et al. |
| 5,270,921 A | 12/1993 | Hornick et al. |
| 5,272,638 A | 12/1993 | Martin et al. |
| 5,283,575 A | 2/1994 | Kao et al. |
| 5,331,546 A | 7/1994 | Webber et al. |
| 5,343,388 A | 8/1994 | Wedelin |
| 5,402,336 A | 3/1995 | Spiegelhoff et al. |
| 5,500,513 A | 3/1996 | Langhans et al. |
| 5,570,283 A | 10/1996 | Shoolery et al. |
| 5,623,413 A | 4/1997 | Matheson et al. |
| 5,644,721 A | 7/1997 | Chung et al. |
| 5,648,900 A | 7/1997 | Bowen et al. |
| 5,652,867 A | 7/1997 | Barlow et al. |
| 5,739,512 A | 4/1998 | Tognazzini |
| 5,802,492 A * | 9/1998 | DeLorme et al. ......... 455/456.5 |
| 5,802,511 A | 9/1998 | Kouchi et al. |
| 5,832,451 A | 11/1998 | Flake et al. |
| 5,832,452 A | 11/1998 | Schneider et al. |
| 5,832,453 A | 11/1998 | O'Brien |
| 5,832,454 A | 11/1998 | Jafri et al. |
| 5,850,617 A | 12/1998 | Libby |
| 5,897,620 A | 4/1999 | Walker et al. |
| 5,899,981 A | 5/1999 | Taylor et al. |
| 5,948,040 A | 9/1999 | Delorme et al. |
| 6,009,408 A | 12/1999 | Buchanan |
| 6,023,679 A | 2/2000 | Acebo et al. |
| 6,029,144 A | 2/2000 | Barrett et al. |
| 6,085,169 A | 7/2000 | Walker et al. |
| 6,115,680 A | 9/2000 | Coffee et al. |
| 6,199,050 B1 | 3/2001 | Alaia et al. |
| 6,275,808 B1 | 8/2001 | DeMarcken |
| 6,295,521 B1 | 9/2001 | DeMarcken et al. |
| 6,298,328 B1 | 10/2001 | Healy et al. |
| 6,307,572 B1 | 10/2001 | Demarcken et al. |
| 6,336,097 B1 | 1/2002 | Scipioni |
| 6,360,205 B1 | 3/2002 | Iyengar et al. |
| 6,377,932 B1 | 4/2002 | DeMarcken |
| 6,381,578 B1 | 4/2002 | DeMarcken |
| 6,434,533 B1 | 8/2002 | Fitzgerald |
| 6,442,526 B1 | 8/2002 | Garland et al. |
| 6,446,048 B1 | 9/2002 | Wells et al. |
| 6,493,695 B1 | 12/2002 | Pickering et al. |
| 6,553,346 B1 | 4/2003 | Walker et al. |
| 6,609,098 B1 | 8/2003 | DeMarcken |
| 6,711,474 B1 | 3/2004 | Treyz et al. |
| 6,801,226 B1 | 10/2004 | Daughtrey |
| 6,826,473 B1 | 11/2004 | Burch et al. |
| 6,847,824 B1 | 1/2005 | Contractor |
| 6,868,400 B1 | 3/2005 | Sundaresan et al. |
| 7,050,986 B1 | 5/2006 | Vance et al. |
| 7,103,558 B1 | 9/2006 | Patton et al. |
| 7,158,980 B2 | 1/2007 | Shen |
| 7,194,417 B1 | 3/2007 | Jones |
| 7,249,041 B2 | 7/2007 | Last |
| 7,263,664 B1 | 8/2007 | Daughtrey |
| 7,277,923 B2 | 10/2007 | Rensin et al. |
| 7,328,166 B1 | 2/2008 | Geoghegan et al. |
| 7,330,110 B1 | 2/2008 | Heintzman et al. |
| 7,343,295 B2 | 3/2008 | Pomerance |
| 7,349,894 B2 | 3/2008 | Barth et al. |
| 7,366,682 B1 * | 4/2008 | Katiyar et al. ............. 705/14.51 |
| 7,395,231 B2 | 7/2008 | Steury et al. |
| 7,409,643 B2 | 8/2008 | Daughtrey |
| 7,483,883 B2 | 1/2009 | Barth et al. |
| 7,493,261 B2 | 2/2009 | Chen et al. |
| 7,502,746 B2 | 3/2009 | Bertram et al. |
| 7,516,089 B1 | 4/2009 | Walker et al. |
| 7,539,620 B2 | 5/2009 | Winterton et al. |
| 7,548,615 B2 | 6/2009 | Bhalgat et al. |
| 7,555,387 B2 | 6/2009 | Sladky et al. |
| 7,746,510 B2 | 6/2010 | Pandipati |
| 7,949,579 B2 | 5/2011 | Keld |
| 8,009,334 B2 | 8/2011 | Pandipati |
| 8,036,978 B1 | 10/2011 | Saavedra-Lim |
| 8,195,194 B1 | 6/2012 | Tseng |
| 8,203,765 B2 | 6/2012 | Pandipati |
| 8,224,830 B2 | 7/2012 | Bidlack |
| 8,271,337 B1 | 9/2012 | Norins |
| 8,373,912 B2 | 2/2013 | Pandipati |
| 8,560,355 B2 | 10/2013 | Adamson et al. |
| 8,693,070 B2 | 4/2014 | Pandipati |
| 8,706,580 B2 | 4/2014 | Houseworth et al. |
| 8,964,395 B2 | 2/2015 | Pav et al. |
| 2001/0001856 A1 | 5/2001 | Gould et al. |
| 2001/0042032 A1 | 11/2001 | Crawshaw et al. |
| 2001/0051911 A1 * | 12/2001 | Marks et al. .................... 705/37 |
| 2001/0053999 A1 * | 12/2001 | Feinberg ........................ 705/14 |
| 2002/0007327 A1 | 1/2002 | Steury et al. |
| 2002/0026416 A1 | 2/2002 | Provinse |
| 2002/0029176 A1 | 3/2002 | Carlson et al. |
| 2002/0042715 A1 | 4/2002 | Kelley |
| 2002/0065688 A1 | 5/2002 | Charlton et al. |
| 2002/0069093 A1 | 6/2002 | Stanfield |
| 2002/0077871 A1 | 6/2002 | Udelhoven et al. |
| 2002/0095256 A1 | 7/2002 | Jones et al. |
| 2002/0100803 A1 | 8/2002 | Sehr |
| 2002/0120765 A1 | 8/2002 | Boehmke |
| 2002/0124067 A1 | 9/2002 | Parupudi et al. |
| 2002/0128971 A1 | 9/2002 | Narasimhan |
| 2002/0147619 A1 | 10/2002 | Floss et al. |
| 2002/0147678 A1 | 10/2002 | Drunsic |
| 2002/0152100 A1 | 10/2002 | Chen et al. |
| 2002/0152101 A1 | 10/2002 | Lawson et al. |
| 2002/0161610 A1 | 10/2002 | Walker et al. |
| 2002/0169509 A1 | 11/2002 | Huang et al. |
| 2002/0173978 A1 | 11/2002 | Boies et al. |
| 2003/0023463 A1 | 1/2003 | Dombroski et al. |
| 2003/0036918 A1 | 2/2003 | Pintsov |
| 2003/0040987 A1 | 2/2003 | Hudson et al. |
| 2003/0046195 A1 | 3/2003 | Mao |
| 2003/0065805 A1 | 4/2003 | Barnes, Jr. |
| 2003/0088487 A1 | 5/2003 | Cheng et al. |
| 2003/0115141 A1 | 6/2003 | Felix et al. |
| 2003/0120526 A1 | 6/2003 | Altman et al. |
| 2003/0141411 A1 | 7/2003 | Pandya |
| 2003/0171990 A1 * | 9/2003 | Rao et al. ........................ 705/14 |
| 2003/0176945 A1 | 9/2003 | Tzouka et al. |
| 2003/0187705 A1 | 10/2003 | Schiff |
| 2003/0225600 A1 | 12/2003 | Slivka et al. |
| 2004/0002876 A1 | 1/2004 | Sommers et al. |
| 2004/0044674 A1 | 3/2004 | Mohammadioun et al. |
| 2004/0083134 A1 | 4/2004 | Spero et al. |
| 2004/0128193 A1 | 7/2004 | Brice et al. |
| 2004/0148228 A1 | 7/2004 | Kwei |
| 2004/0167808 A1 | 8/2004 | Fredericks et al. |
| 2004/0193457 A1 | 9/2004 | Shogren |
| 2004/0198386 A1 | 10/2004 | Dupray |
| 2004/0210497 A1 | 10/2004 | Hirayama et al. |

(56) References Cited

U.S. PATENT DOCUMENTS

| | | |
|---|---|---|
| 2004/0210513 A1 | 10/2004 | Harford et al. |
| 2004/0215566 A1 | 10/2004 | Meurer |
| 2004/0243489 A1 | 12/2004 | Mitchell et al. |
| 2004/0267555 A1 | 12/2004 | Dale |
| 2005/0004830 A1 | 1/2005 | Rozell et al. |
| 2005/0015272 A1 | 1/2005 | Wind |
| 2005/0015295 A1 | 1/2005 | McCulloch |
| 2005/0027705 A1 | 2/2005 | Sadri et al. |
| 2005/0033616 A1 | 2/2005 | Vavul et al. |
| 2005/0033668 A1 | 2/2005 | Garcia et al. |
| 2005/0108068 A1 | 5/2005 | Marcken et al. |
| 2005/0108069 A1 | 5/2005 | Shiran et al. |
| 2005/0108117 A1 | 5/2005 | Newman |
| 2005/0131770 A1 | 6/2005 | Agrawal |
| 2005/0165680 A1 | 7/2005 | Keeling et al. |
| 2005/0203760 A1 | 9/2005 | Gotumukkala et al. |
| 2005/0222854 A1 | 10/2005 | Dale et al. |
| 2005/0222944 A1 | 10/2005 | Dodson, Jr. et al. |
| 2005/0240601 A1 | 10/2005 | Lyons et al. |
| 2005/0251430 A1 | 11/2005 | Jindel |
| 2005/0267787 A1 | 12/2005 | Rose |
| 2005/0288973 A1 | 12/2005 | Taylor et al. |
| 2005/0288976 A1 | 12/2005 | Abrams et al. |
| 2006/0046740 A1 | 3/2006 | Johnson |
| 2006/0053053 A1 | 3/2006 | Baggett |
| 2006/0069504 A1 | 3/2006 | Bradley et al. |
| 2006/0069592 A1 | 3/2006 | Di Florio et al. |
| 2006/0080126 A1 | 4/2006 | Greer et al. |
| 2006/0089907 A1 | 4/2006 | Kohlmaier et al. |
| 2006/0106655 A1 | 5/2006 | Lettovsky et al. |
| 2006/0167834 A1 | 7/2006 | Rubel, Jr. |
| 2006/0206506 A1 | 9/2006 | Fitzpatrick |
| 2006/0212321 A1 | 9/2006 | Vance et al. |
| 2006/0241909 A1 | 10/2006 | Morgan et al. |
| 2006/0241983 A1 | 10/2006 | Viale et al. |
| 2006/0247993 A1 | 11/2006 | Scanlan et al. |
| 2006/0277079 A1 | 12/2006 | Gilligan et al. |
| 2006/0287880 A1 | 12/2006 | Fitzgerald et al. |
| 2006/0293931 A1 | 12/2006 | Fitzgerald et al. |
| 2007/0021909 A1 | 1/2007 | Matsuda |
| 2007/0067193 A1 | 3/2007 | Robertson |
| 2007/0073562 A1 | 3/2007 | Brice et al. |
| 2007/0083401 A1 | 4/2007 | Vogel et al. |
| 2007/0094056 A1 | 4/2007 | Kang et al. |
| 2007/0143155 A1 | 6/2007 | Whitsett et al. |
| 2007/0179863 A1 | 8/2007 | Stoll |
| 2007/0250357 A1 | 10/2007 | Steury et al. |
| 2008/0052217 A1 | 2/2008 | Etkin |
| 2008/0072067 A1 | 3/2008 | Koretz |
| 2008/0077324 A1 | 3/2008 | Hatano et al. |
| 2008/0082373 A1 | 4/2008 | Durocher et al. |
| 2008/0086455 A1 | 4/2008 | Meisels et al. |
| 2008/0091482 A1 | 4/2008 | Whitsett et al. |
| 2008/0097873 A1 | 4/2008 | Cohen et al. |
| 2008/0126143 A1 | 5/2008 | Altman et al. |
| 2008/0154876 A1 | 6/2008 | Hao |
| 2008/0167887 A1 | 7/2008 | Marcken |
| 2008/0189148 A1 | 8/2008 | Diaz et al. |
| 2008/0198761 A1 | 8/2008 | Murawski |
| 2008/0215406 A1 | 9/2008 | Pachon et al. |
| 2008/0221936 A1 | 9/2008 | Patterson |
| 2008/0270224 A1 | 10/2008 | Portman et al. |
| 2008/0319808 A1 | 12/2008 | Wofford et al. |
| 2009/0006143 A1 | 1/2009 | Orttung et al. |
| 2009/0012824 A1 | 1/2009 | Brockway et al. |
| 2009/0088971 A1 | 4/2009 | Currie et al. |
| 2009/0099965 A1 | 4/2009 | Grant |
| 2009/0125321 A1 | 5/2009 | Charlebois et al. |
| 2009/0157292 A1 | 6/2009 | Currie et al. |
| 2009/0157513 A1 | 6/2009 | Bonev et al. |
| 2009/0187449 A1 | 7/2009 | Van Tulder et al. |
| 2009/0210262 A1 | 8/2009 | Rines |
| 2009/0216746 A1 | 8/2009 | Aubin et al. |
| 2009/0234818 A1 | 9/2009 | Lobo et al. |
| 2009/0271302 A1 | 10/2009 | Hamper |
| 2010/0017316 A1 | 1/2010 | Joseph et al. |
| 2010/0045705 A1* | 2/2010 | Vertegaal et al. ............ 345/661 |
| 2010/0057502 A1 | 3/2010 | Arguelles |
| 2010/0057503 A1 | 3/2010 | Katz |
| 2010/0087977 A1 | 4/2010 | Bonne |
| 2010/0121660 A1 | 5/2010 | Boykin |
| 2010/0175001 A1 | 7/2010 | Lazarus et al. |
| 2010/0191550 A1 | 7/2010 | Hutson |
| 2010/0198680 A1 | 8/2010 | Ma et al. |
| 2010/0228628 A1 | 9/2010 | Dufour |
| 2010/0235085 A1* | 9/2010 | Kikuchi ............... G01C 21/367 |
| | | 701/533 |
| 2010/0257195 A1 | 10/2010 | Inoue et al. |
| 2010/0069093 A1 | 11/2010 | Carlson et al. |
| 2010/0305984 A1 | 12/2010 | Ben-Yitschak |
| 2011/0029413 A1 | 2/2011 | Ben-Tzur et al. |
| 2011/0045801 A1 | 2/2011 | Parker, II |
| 2011/0071886 A1* | 3/2011 | Schnur ................... G06Q 10/04 |
| | | 705/7.38 |
| 2011/0137768 A1 | 6/2011 | Onishi et al. |
| 2011/0144898 A1 | 6/2011 | Konig |
| 2011/0246246 A1 | 10/2011 | Johnson |
| 2011/0258005 A1 | 10/2011 | Fredericks et al. |
| 2011/0270715 A1 | 11/2011 | Moorhead |
| 2011/0282964 A1 | 11/2011 | Krishnaswamy |
| 2011/0288768 A1 | 11/2011 | Stefani et al. |
| 2011/0307280 A1 | 12/2011 | Mandelbaum |
| 2011/0313883 A1* | 12/2011 | Angelini ................ G06Q 30/02 |
| | | 705/26.41 |
| 2012/0046049 A1 | 2/2012 | Curtis |
| 2012/0101901 A1 | 4/2012 | DePasquale |
| 2012/0157795 A1 | 6/2012 | Chiu et al. |
| 2012/0185368 A1 | 7/2012 | Schloter et al. |
| 2012/0209640 A1 | 8/2012 | Hamper |
| 2012/0239290 A1 | 9/2012 | Fujita |
| 2012/0281584 A1 | 11/2012 | Powers |
| 2012/0330906 A1 | 12/2012 | Fredericks et al. |
| 2013/0041696 A1 | 2/2013 | Richard |
| 2013/0080053 A1 | 3/2013 | Rakshit |
| 2013/0090966 A1 | 4/2013 | Rivere |
| 2013/0166607 A1 | 6/2013 | Turk et al. |
| 2013/0268878 A1 | 10/2013 | Le Roux et al. |
| 2013/0329943 A1 | 12/2013 | Christopulos et al. |
| 2014/0350972 A1 | 11/2014 | Haywood et al. |

OTHER PUBLICATIONS

PR Newswire, Concur Technologies Launches Concur Expense 7.0, Jul. 24, 2003, p. 1.
"Gelco Information", Business Wire, Mar. 17, 1998.
"American Express Announces New Features in the latest Release of AXI(SM) at Corporate Travel World", PR Newswire, Mar. 2, 1998, p0302NYM159.
File History of U.S. Appl. No. 10/373,096.
File History of U.S. Appl. No. 10/270,672.
File History of U.S. Appl. No. 11/159,398.
File History of U.S. Appl. No. 12/755,127.
File History of U.S. Appl. No. 11/774,489.
File History of U.S. Appl. No. 12/371,548.
Nancy Trejos, "Travelers have no patience for slow mobile websites", dated May 6, 2012, http://www.usatoday.com/USCP/PNI/Features/2012-05-06-PNI0506tra-website-speedART_ST_U.htm.
Gary Stoller, "For Travel Companies, the slower the website, the smaller the potential profit", dated Jun. 1, 2011, http://www.usatoday.com/MONEY/usaedition/2011-06-02-travelweb-27ART_CV_U.htm
File History of U.S. Appl. No. 13/277,923.
Oct. 22, 2009, "Suppliers Work on Ancillary Air Fee Reporting" McNulty Business Travel News.
www.concur.com, from Web Archive, http://web.archive.org/web/20000622043004/http://www.concur.com/, archived Jun. 22, 2000, printed Jan. 6, 2014.
www.outtask.com, from Web Archive, http://web.archive.org/web/20001009025559/http://www.outtask.com/, archived Oct. 9, 2000, printed Jan. 6, 2014.

(56) References Cited

OTHER PUBLICATIONS

File History of U.S. Appl. No. 13/602,589.
Joseph Kornick, "Firm's new system tracks, refunds unused e-tickets" Travel Weekly, May 20, 1999.
Tripit, "Flight Duplicates: Conflict Resolved", Sep. 13, 2010, Concur, 3 pages.
File History of U.S. Appl. No. 09/784,836.
File History of U.S. Appl. No. 10/225,736.
File History of U.S. Appl. No. 11/983,949.
Juile Barker, "Keeping Control When Hotel Costs Soar", Successful Meetings, vol. 47, No. 3, pp. 31, Mar. 1998.
David Eisen, "Setting Up a Hotel Program", Business Travel News, vol. 23, No. 7, pp. 58(8) Apr. 24, 2006.
Edward P. Gilligan, "Trimming Your T&E is Easier Than You Think", Managing Office Technology, vol. 40, No. 11, pp. 39-40, Nov. 1995.
Mal Gormley, "NBAA's Travel$ense", Business and Commercial Aviation, vol. 79, No. 2, pp. 60, Aug. 29, 1996.
Paul Katz et al., "Making the Most of a Telephone Company's Purchasing Power", Belcore Exchange, pp. 23-27, Mar./Apr. 1990.
Amir A. Sadrian et al., "A Procurement Decision Support System in Business Volume Discount Environments", Operations Research, vol. 42, No. 1, pp. 14-23, Jan.-Feb. 1994.
Amir A. Sadrian et al., "Business Volume Discount: A New Perspective on Discount Pricing Strategy", The National Association of Purchasing Management, Inc., pp. 43-46, Apr. 1992.
Robert J. Dolan, "Quantity Discounts: Managerial Issues and Research Opportunities", Marketing Science, vol. 6, No. 1, pp. 1-24, Winter 1987.
Hasan Pirkul et al., "Capacitated Multiple Item Ordering Problem with Quantity Discounts", IIE Transactions, vol. 17, No. 3, pp. 206-211, Sep. 1985.
Paul Katz et al., "Telephone Companies Analyze Price Quotations with Bellcore's PDSS Software", Interfaces 24, pp. 50-63, Jan.-Feb. 1, 1994.
Ram Narasimhan et al., "Optimizing Aggregate Procurement Allocation Decisions", Journal of Purchasing and Materials Management, pp. 23-30, May 1986.
James C. Bean et al., "Reducing Travelling Costs and Player Fatigue in the National Basketball Association", Interfaces, vol. 10, No. 3, pp. 98-102, Jun. 1980.
Gerard Francois, "Socrate: Un Projet Strategique de al SNCF au Services des Voyageures", Revue Generale Des Chemins De Fer, Suppl. No. 6, pp. 7-9, Jun. 1990.
Robert A. Russell et al., "Devising a Cost Effective Schedule for a Baseball League", Operations Research, vol. 42, No. 4, pp. 614-625, Jul.-Aug. 1994.
Jacques A. Ferland et al., "Computer Aided Scheduling for a Sport League", Infor., vol. 29, No. 1, pp. 14-25, Feb. 1991.
Jeffrey L. Huisingh et al., "OffSite: Federal Employee Training Site Selection Software", US Army Tradoc Analysis Center-Monterey Technical Report No. 98-02, Nov. 1998 (163 pages).
Jeffrey Huisingh et al., "New Travel Software Save Time, Money", http://www.dla.mil/Dimensions/Septoct99/Sep98//Sep_page_19.htm, Sep./Oct. 1998 (5 pages).
David A. Shepherd, "A Slam Model of Domestic Airline Passenger Fares and the Contract Air Service Program", Air Force Inst. of Tech., Wright-Patterson AFG, OH. School of Systems and Logistics, Sep. 1986 (136 pages).
D. Bartholomew, "Cleared for Takeoff", InformationWeek, pp. 55, Mar. 1993.
Matthew E. Berge et al., "Demand Drive Dispatch: A method for Dynamic Aircraft Capacity Assignment, Models and Algorithms", Operations Research, vol. 41, No. 1, pp. 153-168, Jan.-Feb. 1993.
U.S. Appl. No. 09/784,029, 2001-0032988, Oct. 25, 2001, U.S. Pat. No. 7,401,029.
File History of U.S. Appl. No. 15/489,361.
File History of U.S. Appl. No. 14/213,523.
File History of U.S. Appl. No. 15/671,770.
U.S. Appl. No. 10/373,096, 2004/0167808, Aug. 26, 2004, U.S. Pat. No. 7,720,702.
U.S. Appl. No. 10/270,672, 2003/0120526, Jun. 26, 2003, Abandoned.
U.S. Appl. No. 11/763,562, 2008/0126143, May 29, 2008, Abandoned.
U.S. Appl. No. 11/159,398, 2005/0289025, Dec. 29, 2005, U.S. Pat. No. 7,974,892.
U.S. Appl. No. 12/755,127, 2010/0257003, Oct. 7, 2010, U.S. Pat. No. 8,140,361.
U.S. Appl. No. 12/773,282, 2011/0258005, Oct. 20, 2011, Pending.
U.S. Appl. No. 12/901,947, 2011/0258006, Oct. 20, 2011, Pending.
U.S. Appl. No. 13/117,303, 2012/0059745, Mar. 8, 2012, Pending.
U.S. Appl. No. 13/277,916, 2012/0101858, Apr. 26, 2012, Pending.
U.S. Appl. No. 13/277,923, 2012/0101901, Apr. 26, 2012, U.S. Pat. No. 8,620,750.
U.S. Appl. No. 13/396,255, 2012/0150572, Jun. 14, 2012, Pending.
U.S. Appl. No. 13/602,589, 2012/0330906, Dec. 27, 2012, U.S. Pat. No. 8,712,811.
U.S. Appl. No. 13/593,108, 2013/0054542, Feb. 28, 2013, Pending.
U.S. Appl. No. 13/606,494, 2014-0074958, Mar. 13, 2014, U.S. Pat. No. 9,286,601.
U.S. Appl. No. 13/712,614, 2013/0110833, May 2, 2013, Abandoned.
U.S. Appl. No. 13/712,629, 2013/0197948, Aug. 1, 2013, Pending.
U.S. Appl. No. 13/842,913, 2013/0218615, Aug. 22, 2013, Abandoned.
U.S. Appl. No. 13/830,410, 2013/0227040, Aug. 29, 2013, Pending.
U.S. Appl. No. 13/830,319, 2013/0218613, Aug. 22, 2013, Abandoned.
U.S. Appl. No. 14/036,320, 2014/0095221, Apr. 3, 2014, Abandoned.
U.S. Appl. No. 14/060,960, 2014-0122239, May 1, 2014, Pending.
U.S. Appl. No. 14/188,414, 2014-0250122, Sep. 4, 2014, Abandoned.
U.S. Appl. No. 14/213,523, 2014-0270575, Sep. 18, 2014, Pending.
U.S. Appl. No. 14/213,550, 2014-0279268, Sep. 18, 2014, Pending.
U.S. Appl. No. 14/219,745, 2014-0288981, Sep. 25, 2014, Pending.
U.S. Appl. No. 12/465,067, 2009-0287546, Nov. 19, 2009, Pending.
U.S. Appl. No. 09/784,836, 2001-0032988, Oct. 25, 2001, U.S. Pat. No. 7,401,029.
U.S. Appl. No. 10/225,736, filed Aug. 22, 2002, Abandoned.
U.S. Appl. No. 11/983,949, filed Nov. 13, 2007, Abandoned.
U.S. Appl. No. 14/994,822, 2016-0132977, May 12, 2016, Pending.
U.S. Appl. No. 14/997,019, 2016-0132795, May 12, 2016, Pending.
U.S. Appl. No. 15/137,196, 2016-0239515, Aug. 18, 2016, Pending.
U.S. Appl. No. 15/489,361, 2017-0221104, Aug. 3, 2017, Pending.
U.S. Appl. No. 15/602,872, 2017-0262775, Sep. 14, 2017, U.S. Pat. No. 9,928,470.
U.S. Appl. No. 15/671,770, filed Aug. 8, 2017, Pending.
U.S. Appl. No. 15/893,161, filed Feb. 9, 2018, Pending.
File History of U.S. Appl. No. 12/773,282.
File History of U.S. Appl. No. 11/763,562.
File History of U.S. Appl. No. 13/117,303.
File History of U.S. Appl. No. 13/593,108.
File History of U.S. Appl. No. 13/606,494.
File History of U.S. Appl. No. 13/712,614.
File History of U.S. Appl. No. 13/842,913.
File History of U.S. Appl. No. 13/830,410.
File History of U.S. Appl. No. 13/830,319.
File History of U.S. Appl. No. 14/036,320.
File History of U.S. Appl. No. 14/060,960.
File History of U.S. Appl. No. 14/188,414.
File History of U.S. Appl. No. 14/213,550.
File History of U.S. Appl. No. 14/994,822.
File History of U.S. Appl. No. 14/997,019.
File History of U.S. Appl. No. 15/602,872.
File History of U.S. Appl. No. 12/901,947.
File History of U.S. Appl. No. 13/396,255.
File History of U.S. Appl. No. 13/712,629.
File History of U.S. Appl. No. 14/219,745.

(56) References Cited

OTHER PUBLICATIONS

File History of U.S. Appl. No. 12/465,067.
File History of U.S. Appl. No. 15/137,196.
File History of U.S. Appl. No. 15/893,161.

* cited by examiner

METHOD AND SYSTEM FOR TARGETING MESSAGES TO TRAVELERS

CROSS-REFERENCE TO RELATED APPLICATIONS

This application claims priority from U.S. Provisional Application Nos. 61/405,480, filed Oct. 21, 2010, and 61/405,488, filed Oct. 21, 2010, the entireties of which are incorporated by reference herein.

DETAILED DESCRIPTION OF EMBODIMENTS OF THE INVENTION

Figure 1:
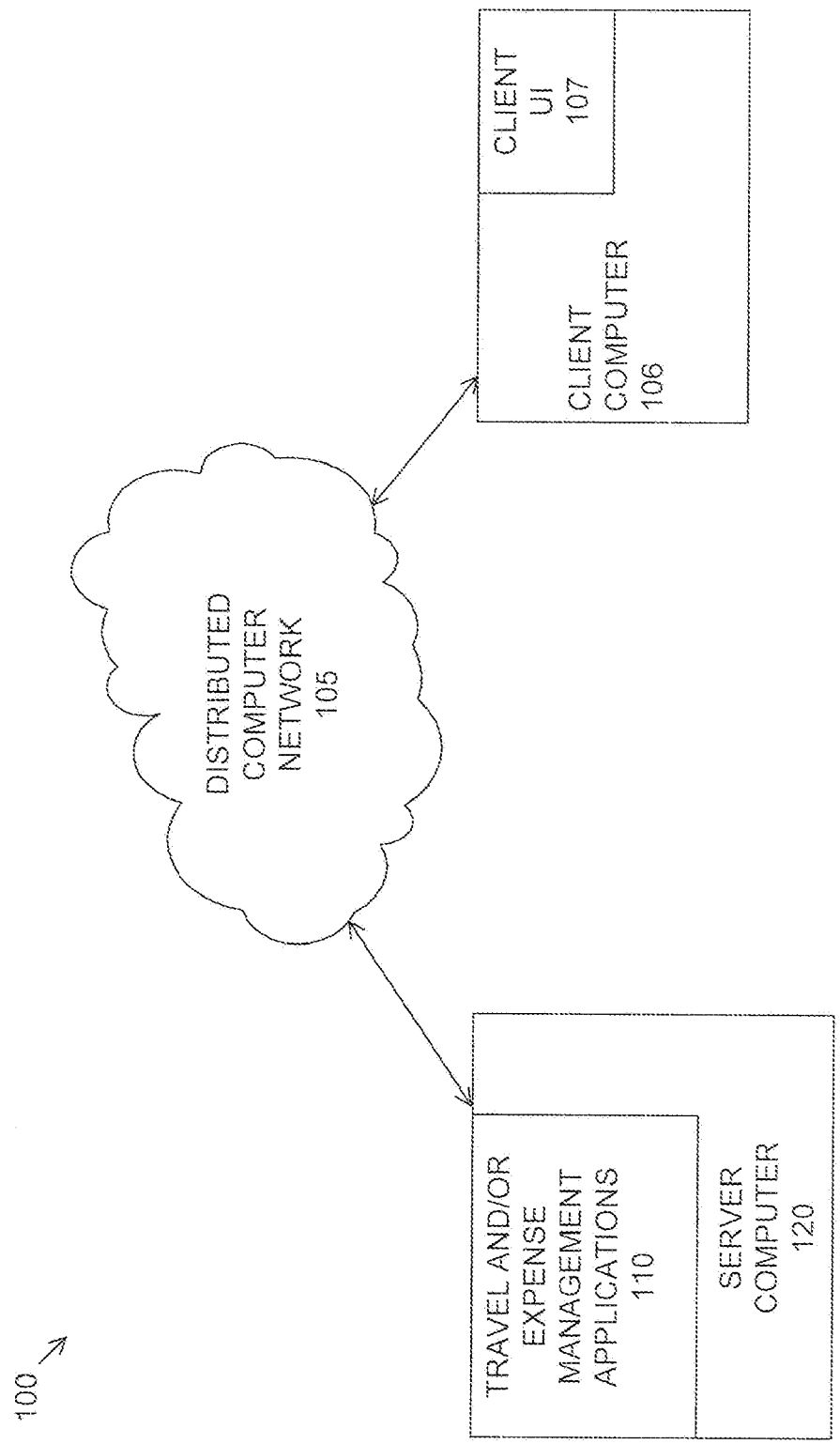
FIG. 1 illustrates a system for targeting messages to travelers, according to one embodiment.

FIG. 1 illustrates a system 100 for targeting messages to travelers, according to one embodiment. Using an environment such as the one illustrated in FIG. 1, messages targeted to a particular user can be sent. In one embodiment, travelers can be sent targeted messages (e.g., from a host) while they utilize applications and/or devices (e.g., personal digital assistant, phone, smart phone, etc.) when they travel. These devices and/or applications can also include features that provide weather information, flight information (e.g., status, schedule, gate, and baggage information), travel reservation and/or itinerary information (e.g., for air, rail, hotel, car, limousine, taxi, dining, or airport parking), or global positioning system (GPS) information (e.g., to help target messages), or any combination thereof. Those of ordinary skill in the art will see that many other features can be included. In addition, some devices and/or applications can integrate with other devices and/or applications so that information can be exchanged to improve the travel experience.

One example of system 100 is set forth in FIG. 1. However, it should be noted that system 100 could include: a traditional web-based application inside a computer browser, a client-server application which runs on a local personal computer, a mobile web application which is optimized for a smart phone or PDA, a system that involves sending email, text or other short messages to a device (e.g., phone computer), or a mobile application that runs as a program on a smart phone, PDA, IPAD®, or other mobile computing device; or any combination thereof.

FIG. 1 illustrates some primary components of system 100, according to an embodiment of the present invention. System 100 can comprise: a distributed computer network 105; a client computer 106; a client user interface (UI) module 107; or a booking and/or expense management application 110 in communication with a host server computer 120; or any combination thereof. It should be noted that many configurations are possible. For example, the booking and/or expense management application 110 can be accessed from the work stations 106, which can communicate with the host server computer 120. In addition, the booking and/or expense management application 110 can be wholly or partially located on the client work station 106. Additionally, the booking and/or expense management application 110 can be wholly or partially located on the host server computer 120. Those of ordinary skill in the art will see that other configurations are also possible. It should be noted that any of the modules, applications, systems, etc. of FIG. 1 or 2 can be optional, or can be fully or partially combined with other modules/applications, systems, etc.

Referring back to FIG. 1, the distributed computer network 105 can be a network (e.g., Internet, Intranet) that facilitates communication between one or more client computers 106, such as, but not limited to: personal computers (PCs), minicomputers, microcomputers, main frame computers, telephone devices, or other wired or wireless devices, such as hand-held devices, or any combination thereof. FIG. 1 also illustrates a booking and/or expense management application 110, which is housed, for example, on a host server computer 120, which can include, but is not limited to: a minicomputer, a microcomputer, a PC, a mainframe computer, or any device with a processor and repository (e.g., database) or coupling to a repository, or any combination thereof.

The client computer 106 can accept input from users, and allow users to view output from the travel and/or expense management application 110. The client UI module 107 can include software on the client computer 106 that can let a user view, for example, HyperText Markup Language (HTML) documents and access files and software related to those documents. The present invention can utilize, for example, HTML-based systems, Java-based systems, XML-based systems, or systems where a custom-built application communicates over the network, or any combination thereof. Those of ordinary skill in the art will see that many other types of systems can be utilized.

The booking and/or expense management application 110 can work on or with a client UI module 107 to display information to the user so that services and/or products can be booked and/or expensed. Some details of the booking and/or expense management application 110 are set out in FIG. 2. The booking and/or expense management application 110 can work with many other types of tools (e.g., global distribution system, service provider website (e.g., airline website, car rental website), or internal database, or any combination thereof) to determine which offers are available that correspond with the primary service and/or product the user is interested in buying. For example, the booking and/or expense management application 110 can retrieve messages from an API (Application Programming Interface) (e.g., SERVE, SAVORED, GROUPON, THE DEALMAP) and then send those messages to users. In other embodiments, messages may be retrieved from a database (e.g., internal to system 100, external to system 100) and sent to users. The booking and/or expense management application 110 can also send targeted messages that include a link to launch an API and/or website (e.g., hotel finder, fuel finder, taxi finder, restaurant finder, deals website). For example, if it is known that a user has rented a rental car, and is flying out of Dallas, Tex. in the next few hours, a targeted message including a link to a fuel finder application may be sent to the user.

Figure 2:
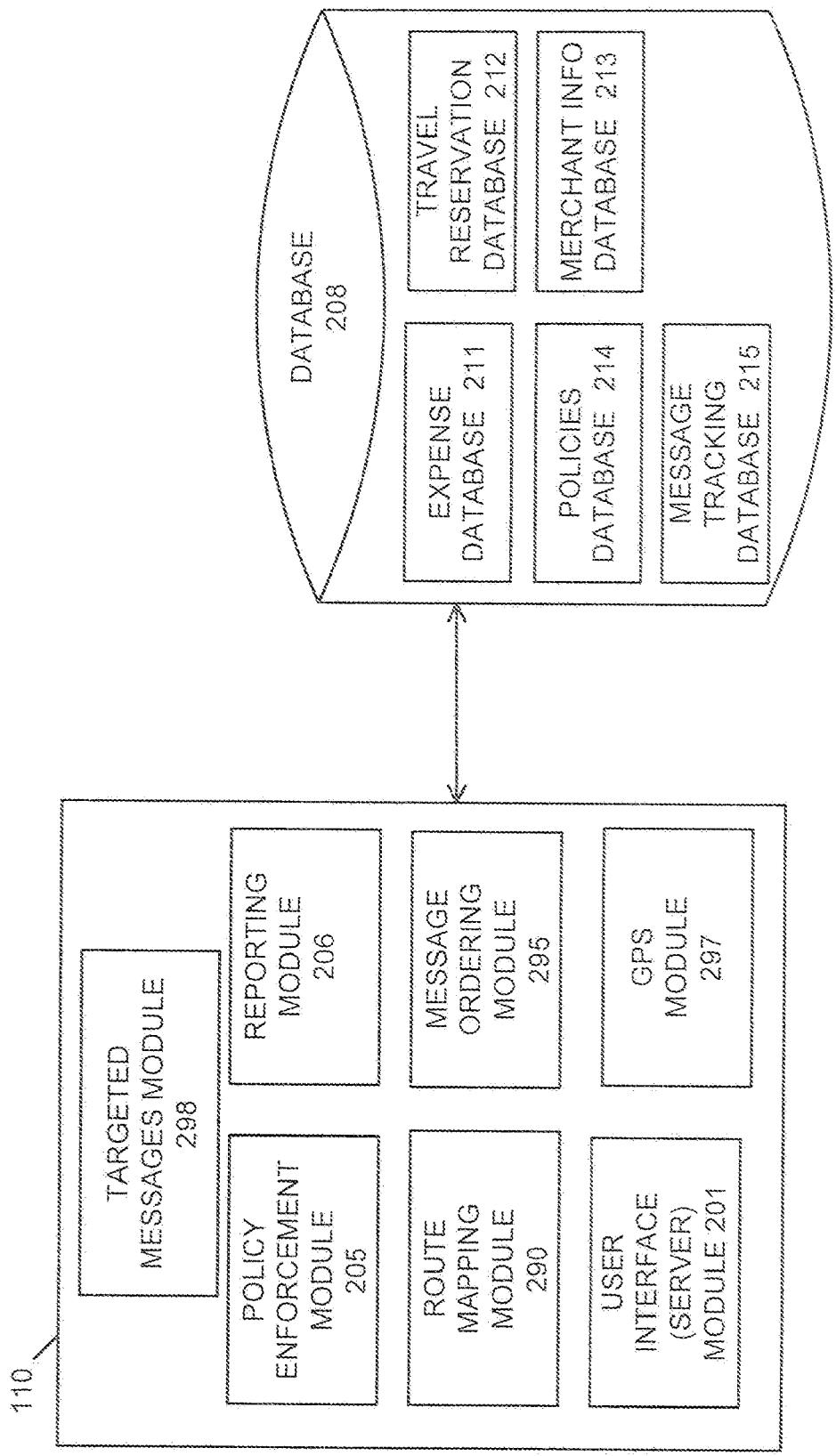
FIG. 2 is a system diagram illustrating booking and/or expense management application of FIG. 1, according to one embodiment of the present invention.

FIG. 2 is a system diagram illustrating booking and/or expense management application 110 of FIG. 1, according to one embodiment of the present invention. The booking and/or expense management application 110 can comprise a server UI module 201, a policy enforcement module 205, a reporting module 206, or a targeted messages module 298, or any combination thereof. These modules may be in contact with a database 208. While these various modules are explained with respect to the booking and/or expense management application 110, those of ordinary skill in the art will see that not all modules described are necessary. In addition, additional modules or combination modules are possible. Additionally, it should be noted that pieces of modules can be utilized with or without other modules.

In one embodiment, the booking and/or expense management application 110 can include a server module 201, which can communicate with a client module 107 (e.g., on a client work station 106) through the network 105. The server module 201 can transmit data to the client module 107 (e.g., corporate policy data, data accumulated from various travel and expense data sources). Additional details on submitting expense reports, downloading travel data, or other credit card data can be found in the patent applications which are incorporated by reference.

Those experienced in the art will recognize that many other modules can be used to build the booking and/or expense management application 110. Data found and utilized by the booking and/or expense management application 110 can be stored in database 208. In one embodiment, the database 208 can comprise a travel reservation (e.g., itinerary, reservation) database 212, an expense database 211, a merchant information database 213, a policies database 214, a message tracking database 215, or any combination thereof.

The travel reservation database 212 can comprise data received by using some combination of multiple sources (e.g., an on-line booking tool, a travel agent, contact with a travel vendor, a provider reservation and/or sale system, a provider ancillary option system). The travel request data from these sources can be assembled and stored in the travel reservation database 212.

The expense database 211 can comprise expense data received from multiple sources as well. The payer (e.g., the user, the traveler, the traveler's assistant), can pay the travel agency or travel vendor with, for example, a credit card. The record of this transaction can go to the credit card vendor, which can transmit funds to the travel vendor for the amount purchased. The expense database 211 could be used in the following example: after travel occurs, and a user goes to submit an expense report, information about offers can be retrieved from, for example, the expense database 211 because all information on offers can be saved to this or another database.

The policy database 214 can comprise data relating to various entities policies. Information from the policy database 214 can be used by the policy enforcement module 205 to review targeted messages (e.g., offers) to make sure they comply with entity policies. Information from the policy database 214 can also be used by the message ordering module 295 to prioritize offers based on whether they comply with the entities' policies.

The message tracking database 215 can comprise data relating to how the traveler (or someone associated with the traveler, such as an assistant, colleague, family member, etc.) interacted with the message.

Those of ordinary skill in the art will see that the various databases can be combined or broken, up further in some embodiments of the invention.

The booking and/or expense management application 110 can receive travel data from a travel system, expense transaction data from a credit card vendor, and purchasing data from a travel vendor. For a given expense, data may be present from any number of sources, including the possibility that no data is present. The booking and/or expense management application 110 can receive data from the multiple sources at different times and different rates. A source could transmit data continuously or near-continuously (e.g., once per hour), daily, weekly, or even monthly or at longer intervals. The booking and/or expense management application 110 can store all the data received from all the sources when the information is received. The booking and/or expense management application 110 can identify the traveler corresponding to a given travel request and/or expense data and/or using an affinity program number (e.g., frequent flier number). Expense data can come encoded with a credit card number that has been assigned to a specific person. For example, for central billed cards, other traveler-identifying information can be included. In an alternate embodiment, if a user uses an on-line self-booking tool to make a travel request, an identification of the user making the request (or user on whose behalf the request is made) can be stored at the time of request, and the record locator from the PNR can also be stored. Travel data identified by this specific record locator can be mapped to a specific traveler. Information about a traveler can be embedded into the remarks section of the PNR by the travel agency, or the passenger's name can be read from the PNR. Similar methods can be used to identify the traveler on data transmitted directly from a travel vendor. Additionally other uniquely identifying information, such as frequent traveler numbers, can be used.

The booking and/or expense management application 110 can also include a policy enforcement module 205. The policy enforcement module 205 can review, for example, various offers to make sure they comply with entity policy before displaying any offers to a user. The policy enforcement module 205 can also be used with the message ordering module 295 to show or send offers in a particular order.

The route mapping module 290 can use information from the various databases, as well as information from the GPS module 297, to map a traveler's route for a particular time period.

Figure 3:
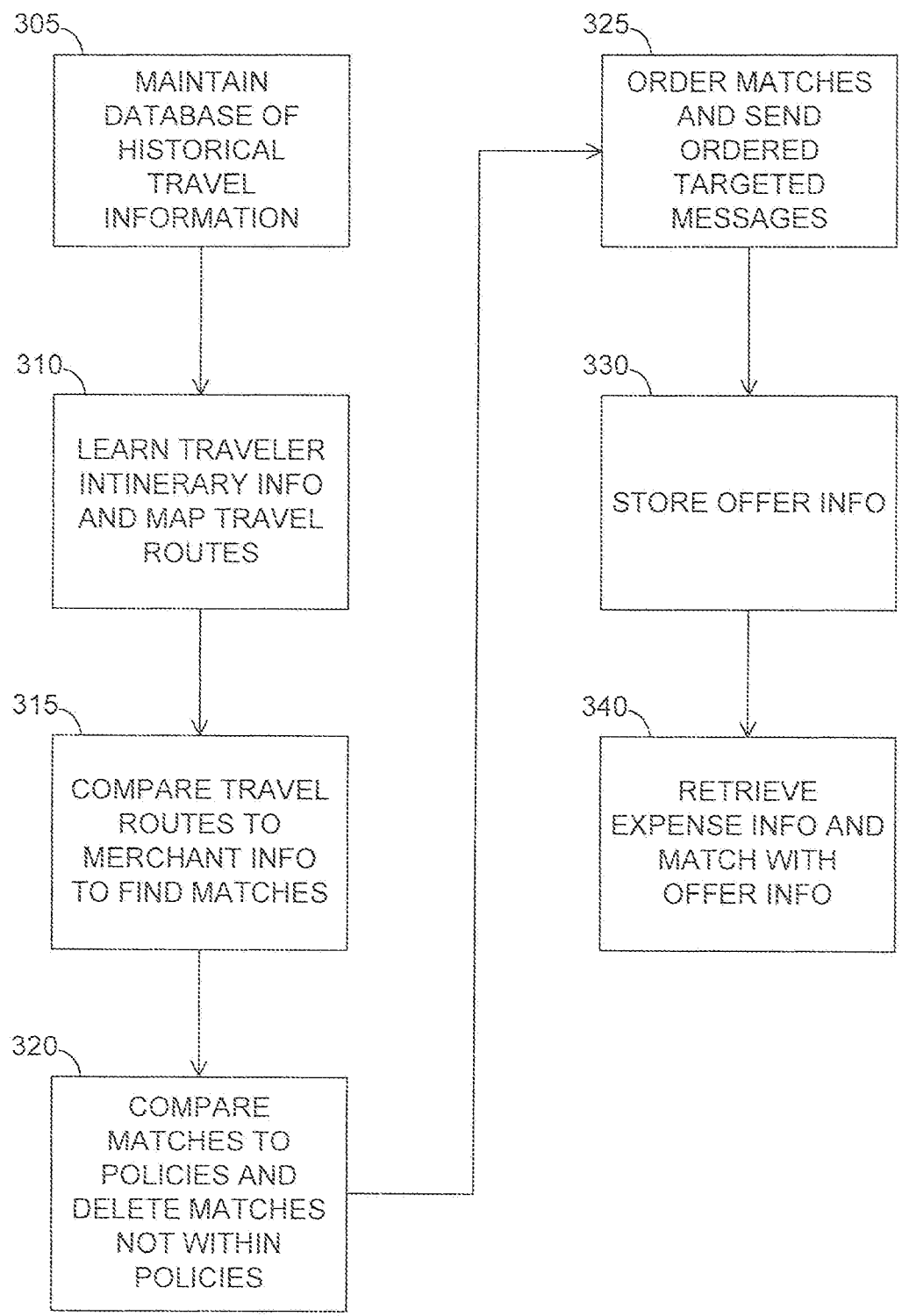
FIG. 3 sets forth a method for targeting messages to travelers, according to one embodiment.

FIG. 3 sets forth a method for targeting messages to travelers, according to one embodiment. In some embodiments, hosts creating and/or managing devices and/or applications can charge a fee for the use of the device and/or application that enables sending targeted messages, or can charge others (e.g., merchants including venders, providers, and/or suppliers) for the ability to target messages to the travelers, or both. In some cases, targeted messages can generate revenue for the host managing the targeted messages based on: whether or not the traveler "clicks" on or views the targeted message to get more information (e.g., pay per click, pay per view); or if a purchase or reservation of some form is completed; or any combination thereof. Those of ordinary skill in the art will see that other methods can be used to generate revenue for an entity.

In some embodiments, merchants can choose whether or not, and to whom, they would like to send targeted messages on a given day or at a given hour based on information the merchant has at a certain point in time. In some embodiments, a merchant can send information on whether and to whom he would like to receive targeted messages from any type of device (e.g., computer, mobile device). For example, the host can notify a restaurant manager that there are a certain number of travelers in the area that meet certain criteria (e.g., criteria set by the restaurant and/or criteria the host thinks indicates that certain travelers might be interested in a particular restaurant). The restaurant manager can then wander around and check the kitchen, the reception area, and/or the floor and determine he can handle more business that evening, and then send a message or respond to an inquiry from the host from his cell phone to a host indicating that he would like to send a coupon to a certain set of travelers (e.g., any traveler within a 20 mile radius that is under 30). As another example, a restaurant manager may decide that he would like anyone the host knows that will likely be within a 20 mile radius under 30 to be automatically sent a coupon.

In some embodiments, entities can control the devices and/or applications that a traveler utilizes. For example, an entity (company, government, non-profit or other entity) and/or the travel agency may prefer a mobile application that connects with the travel agency and/or travel systems selected by the entity. Travel managers at entities have a vested interest in knowing where all their travelers are at any given time. Were a major event such as war, volcano, earthquake, or bridge collapse to occur, the travel manager has an obligation to try to determine if any travelers are impacted, determine whether each traveler is safe, and potentially re-route the traveler based on the changing circumstances on the ground. Travel managers can rely on reporting systems provided by travel agencies and/or travel systems to determine the location of each traveler. If travelers do not purchase their travel through the entity's travel agency and/or travel system (e.g., utilizing a telephone, on on-line or mobile phone-enabled application that ties into the travel agency's systems), then the travel agency and/or travel system may not be able to provide this reporting. The consequent loss of accuracy in this reporting may negatively impact the travel agency and/or travel system's business.

Referring to FIG. 3, in 305, a database 208, including traveler information (e.g., travel itineraries (e.g., past, present, future, or any combination thereof) in a travel reservation database 212 and/or expense reporting information (e.g., past, present, future, or any combination thereof) in an expense database 211), can be maintained. In this manner, information about the different types of travelers (e.g., who the travelers are, where the travelers are going, demographic information) and what they tend to purchase when they travel can be learned.

In 310, the targeting messages module 298 can search for itinerary information in a travel reservation database 212 and map out travel routes for travelers in designated areas (e.g., where merchants that are and/or might be interested in sending targeted messages have establishments). For example, the traveler's travel route can be compared to addresses of merchants who have indicated they are or may be interested in sending targeted matches to the travelers. The itinerary information and/or GPS information can be reviewed to know what travelers are traveling at a certain point in time, where they are going, and where they are currently. The targeting messages module 298 can then map out the travelers travel routes for a particular time. For example. the targeting messages module 298 can be programmed to automatically search database 211 and 212 at a certain time every day to determine if any travelers are leaving within the next 48 hours (or any other amount of time), and give those itineraries to an itinerary route mapping module 290, which can then map out the travelers travel map for 48 hours (or any other amount of time). For example, the targeting messages module 298 could determine that it knows of 300 people who should be or are traveling to the Washington DC metropolitan area on a particular date. Based on the hotel reservations or pre-paid hotel rooms, the targeting messages module 298 can determine 125 of the 300 travelers are staying in or near Tyson's Corner in McLean, Va.

In 315, the travel routes and optionally traveler information can be compared with message information to determine if there are any matches and then targeted messages can be sent accordingly. For example, the travel routes and traveler information can be broken down to fit in categories. The categories can then be searched to determine if there is a match. It should be noted that there are many other ways of determining matches. It should also be noted that traveler information can include expense information, itinerary information, or preference information, or any combination thereof. Preference information may include preference information entered by a particular user or for a particular user. Preference information may also include preferences guessed for a particular user by using information derived from similar users (e.g., using machine learning techniques implemented in systems run by HADOOP, GOOGLE, AMAZON, NETFLIX).

For example, in some embodiments, merchants who have signed up for notifications can be sent information about how many travelers there are near or that will be near their establishment that are likely to be interested in the merchant's product and/or service. Information on who may be interested can be derived from spending information, such as, but not limited to: past spending (e.g., names of establishments where the traveler previously bought products and/or services, types of establishments where the traveler previously bought products or services (e.g., based on SIC codes, MCC codes, NAICS codes, other codes); type of expense traveler chose when entering expense in expense report; number of guests traveler entertains when traveling; the amount the traveler normally spends on products and/or services; the traveler's entity's allowances for products and/or services; or any combination thereof). Information about the merchants that have signed up for the notifications can be stored in merchant information database 213. The information in the merchant information database 213 can include, but is not limited to: who the merchants are; where they are located; what they sell; what special offers they have (e.g., coupons, etc.); what type of demographics they are interested in; type of merchant establishment (e.g., based on SIC codes, MCC codes, NAICS codes, other codes); typical prices the merchant charges; or hours of operation for the merchant; or any combination thereof.

The notification to the merchant could be, but is not limited to: an e-mail; an alert in a web or desktop application (e.g., on a computer and/or mobile device (e.g., phone)); a voice mail for a mobile phone; an SMS text for a mobile phone; or an alert inside an application running on a mobile phone; or any combination thereof. Those of ordinary skill in the art will see that any type of device a merchant could use with the capability to send and/or receive messages can be utilized.

In some embodiments, the merchant can choose which travelers to target based on demographic information (e.g., age, profession, salary, etc.), name information, information about the traveler's itinerary (e.g., it is known the traveler is staying at a particular hotel where a convention is taking place, so the merchant could send targeted messages to travelers also staying at the hotel indicating they can meet up with colleagues with the convention at a certain restaurant and get a discount). The merchant can also tailor an offer in a manner that adapts to the daily and/or hourly circumstances. In one embodiment, a device can receive targeted messages, and information regarding when to display or not display the targeted messages (e.g., at a certain time or within a certain time range, when the user is at or is not at a certain location or within a location range (e.g., latitude and longitude), etc.). In this way, for example, in some circumstances, targeted messages may be cached for a future event, and may be shown on the device even when the device is not connected to the network using, for example, previously known travel, expense and/or GPS data.

In other embodiments, targeted messages can be automatically matched and sent when a traveler (or a traveler's device) requests itinerary information. In this way, the merchants do not need to be further involved for the targeted messages to be sent.

For example, based on the spending information of the 125 travelers in the Tyson's Corner example, the targeting messages module 298 can determine that 45 of the 125 travelers that will be at Tyson's Corner would be receptive to an offer for fine dining. In some embodiments, a notification (e.g., a SMS text) can then be sent to merchant contacts (e.g., managers of Capitol Grille, the Palm, etc.) who have signed up with the host, indicating that there are 45 travelers who will likely be near their establishment that day. Information can also be communicated indicating that 28 of the travelers are already in the Tyson's corner area (e.g., and may be available for lunch and/or dinner) with the remaining 17 travelers arriving later but still before the dinner hour. A manager can check the reservation book and see that, for example, the restaurant is full for dinner but has plenty of space for lunch. Thus, the manager can choose to send a targeted message to the 28 travelers offering a free appetizer with purchase of a meal during the hours of 11 AM and 2 PM. As another example, the manager can determine at about 3 PM that he has many reservations for 7:30 PM and later, but fewer before 7:30 PM. The manager can thus send a targeted message advertising a discount for early bird meals where the traveler is seated before 6 PM, and have the targeted message sent and/or shown from 3 PM until 5:40 PM. In this way, the merchant can fill otherwise empty seats without having to offer a discount or promotion for the later hours when the house is already filled.

It should be noted that, in some embodiments, the merchants can pre-authorize a certain level of targeted messages to be sent so that the merchant does not need to give authorization. Thus, the merchant has the ability to pre-authorize previously saved offers. The merchant can also put a start time and stop time, or other criteria indicating when any targeted message should be delivered, if applicable.

In some embodiments, the physical location of the traveler (obtained, i.e., via GPS embedded in a mobile phone) can be combined with itinerary information to tailor an offer. For example, if a traveler is traveling from Washington DC to Seattle, Wash. on a flight which connects through Chicago. If the traveler's GPS information indicates that they are still in Washington DC but not at the airport, taxi, limo, and/or pre-paid parking can be offered. If the traveler is at the airport in Washington or Chicago, discounts to a coffee shop and/or restaurant in the airport can be offered if there is more than 20 minutes before the traveler's flight. (Note that, in some embodiments, information on whether flights are delayed or cancelled can also be taken into account.) If in any location, the traveler does not have a hotel reservation, he could be reminded about the entity's preferred hotels. If the traveler is in Seattle, dinner near the traveler's current location or near the traveler's hotel can be advertised and/or a coupon can be sent.

In 320, the targeted messages module 298 can use policy information in a policy database 214 to determine if a targeted message conflicts with an entity's policies. Targeted messages for certain travelers can then be deleted if those messages do not comply with the traveler's entity's policy. In some embodiments, the policies can help select which targeted message(s) will be presented, and in what order. For example, an entity may have a corporate negotiated contract with a MARRIOTT property in a given city where a preferential rate is offered in exchange for driving a certain amount of volume to that hotel property. If a traveler arriving in that city sees a targeted message for a HYATT property, offering a discount or preferential amenity that makes the HYATT attractive to the traveler, the traveler may choose to stay at the HYATT, which denies the entity the ability to use this stay towards their volume commitment at the MARRIOTT. Thus, the entity may choose to have only Marriott offers displayed. In addition, an entity may have a policy that dinner should cost no more than $25 per night, so a message recommending the local Morton's steak house would not be shown (or would be shown after cheaper dinner options).

In 325, the targeting messages module 298 can send, in, for example, a prioritized manner, the targeted messages that the merchants have indicated they would like to send. In this way, the traveler will view or otherwise receive the targeted messages in a certain order. The prioritization can be based on vendor criteria and/or how well a message targets a given traveler. This can help optimize the benefit to the traveler, so the traveler will not complain about the offers, and may view them as a benefit. This can also optimize the revenue to the host because the more effective the offer (e.g., as far as the offer being used and generating revenue and profit for the vendor), the more the vendors will pay). Thus, the ordering can be done, for example, based on: how much a vendor has paid or may pay for the targeted message; whether a vendor has paid or may pay in order for his targeted message to be shown before other targeted messages; traveler preferences; travel patterns determined from the traveler's past behavior; categorization of the traveler as compared to other similar travelers; or the traveler's entity's policies; or any combination thereof. It should be noted that there are many other reasons the ordering of the targeted messages can be prioritized or changed.

The targeted message can be presented in many ways, including, but not limited to: an e-mail, an alert in a web or desktop application (e.g., on a computer and/or a mobile device (e.g., phone) when viewing the traveler's itinerary); a voice mail for a mobile phone; an SMS text for a mobile phone; or an alert inside an application running on a mobile phone (e.g., when viewing the traveler's itinerary); or any combination thereof.

In 330, the targeting messages module 298 can send information about the targeted messages that are actually sent can be stored in a message tracking database 215. For example, information can be compiled, including, but not limited to: how many travelers were sent the targeted message, how many travelers actually viewed the targeted message (e.g., opened and/or accessed a text or email), whether the traveler interacted with the targeted message, when a user interacted with the targeted message (e.g., time information), or whether the traveler used a coupon or other offer communicated in the targeted message, or any combination thereof. It should be noted that there are many other types of information about the targeted messages that can be stored.

In 340, the targeted messages module 298 can retrieve information from the expense database 211 and search the message tracking database 215 to determine whether a targeted message was utilized by a traveler. For example, some targeted messages may not require any interaction. The targeted message may simply recommend a given establishment and give directions, with no further information. Thus, the host may need to know which travelers actually took the merchant up on the offer. The host can rely on the merchant to provide this information. In addition, the targeted messages module 298 can also search information in the expense database 211 to determine which travelers expensed a product and\or service from a particular merchant. The targeted messages database 215 can then be searched to determine if any of those travelers had received or interacted with a targeted message from that particular merchant. This can be done, for example, in an audit by a person and/or an automated audit, to help ensure that a merchant is paying for what he should (e.g., a restaurant may not pay unless a reservation is made or if the traveler shows up and purchases something). The stored information can also be used to help optimize targeting in the future for this traveler as well as other travelers (e.g., with similar demographic information).

Thus, for example, if the offer is transmitted to the 45 travelers and 20 click on the offer (which is a $10 coupon) and 10 use the offer, the merchant could be charged for the 45 that were sent the offer; for the 20 that clicked on the offer; or for the 10 that used the offer; or any combination thereof. In some embodiments, merchants can only be charged when a traveler actually buys their product and/or service. In this way, if no-one takes the manager up on the offer, the manager may not have to pay. The merchant can report this information to the host or the host could audit and/or search the expense database 211 to see, for example, who ate at the Morton's in Tyson's Corner on a particular day.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages, are presented for example purposes only. The disclosed methodology and system are each sufficiently flexible and configurable, such that it may be utilized in ways other than that shown. For example, the steps listed in any flowchart may be re-ordered or only optionally used (even when not explicitly indicated) in some embodiments. Thus, those skilled in the art will realize that the ordering of the steps of the figures can be altered in other embodiments and that various steps can be removed in some embodiments.

It should be noted that Applicant has, for consistency reasons, used the phrase "comprising" throughout the claims instead of, or in addition to, "including, but not limited to". However, it should be noted that "comprising" should be interpreted as meaning "including, but not limited to".

In addition, it should be noted that, if not already set forth explicitly, the term "a" should be interpreted as "at least one" and "the", "said", etc. should be interpreted as "the at least one", "said at least one", etc.

It should be noted that the purpose of any Abstract of the Disclosure, Summary, or Background section is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure, Summary, or Background section are not intended to limit the scope of the invention in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A computer-implemented method of targeting messages to at least one traveler, comprising:
   receiving a request, from at least one merchant to transmit messages to at least one device of at least one traveler based on the current or future location of that traveler and a categorization of the traveler;
   receiving, by the computer, a device location detected by a location module of the at least one device;
   determining, by the computer, location information of the at least one traveler, the location information comprising current location information of the at least one traveler based on the device location and projected location information of the at least one traveler during at least one giving time period, the determining comprising extracting at least a portion of the location information from itinerary information received from multiple electronic sources;
   determining, by the computer, prior expense report information related to where the at least one traveler has been previously, the prior expense report information comprising: average number of guest the at least one traveler entertains when traveling, average amount a traveler spends on products/services, and allowance a traveler is given for products and/or services;
   determining, by the computer, entity expense policy for the at least one traveler, the entity expense policy comprising information related to policies an entity has regarding reimbursable traveler expenses and/or preferable expense providers;
   categorizing, by the computer, the location information, the prior expense information, and the entity expense policy information into at least one category, the categorizing comprising generating a projected route based on the location information and analyzing the prior expense information and the entity expense policy information to identify at least one offer of interest;
   wherein the generating of the projected route comprises:
      searching the itinerary information to determine which travelers will be traveling to a destination of interest;
      searching an expense database and a travel reservation database at predetermined times to determine if any travelers are leaving for the destination of interest within a predetermined amount of time and to determine traveler interests based on the prior expense report information, the searching performed using filtering accounting for: the average number of guest the at least one traveler entertains when traveling, the average amount a traveler spends on products/services, and the allowance a traveler is given for products and/or services; and
      creating, using the itinerary route mapping module, travel maps for travelers with itineraries that have the traveler leaving for the destination of interest within the predetermined amount of time;
   matching, by the computer, the at least one category for the location information, the prior expense information, and the policy information against at least one category for available targeted messages to determine if there are any matches, the matching comprising comparing the projected route and the at least one offer of interest to a plurality of offers applying to the at least one category;

receiving, by the computer, an updated device location detected by the location module of the at least one device;

determining, by the computer, that the at least one device is in a location corresponding to the projected location information based on the updated device location; and in response to determining that the at least one device is in the location corresponding to the projected location information, transmitting to the at least one device of the at least one traveler any targeted messages that have at least one category that matches at least one category for the location information, the prior expense information, and the policy information to at least one device of the at least one traveler, wherein the location information, the prior expense information, and the policy information is utilized to help determine what products and/or services the at least one traveler is likely to purchase when traveling.

2. The method of claim 1, further comprising receiving preference information and using the preference information to determine what available targeted messages are of interest to the at least one traveler.

3. The method of claim 1, further comprising processing information related to collecting at least one fee from the at least one merchant for transmitting at least one targeted message to the at least one traveler.

4. The method of claim 1, further comprising processing information related to collecting at least one fee from at least one merchant when the at least one traveler acts upon at least one targeted message.

5. The method of claim 1, further comprising processing information associated with storing information associated with any purchase of at least one good and/or at least one service by the at least one traveler.

6. The method of claim 5, further comprising processing information related to auditing expense reporting information for the at least one traveler to know whether or not the at least one good and/or the at least one service was purchased.

7. The method of claim 1, wherein the location information also comprises global positioning system (GPS) information.

8. The method of claim 1, wherein multiple matches are found and multiple targeted messages are transmitted in a prioritized manner.

9. The method of claim 1, wherein only targeted messages that offer at least one product and/or at least one service that complies with the at least one traveler's entity's policies are transmitted.

10. The method of claim 1, wherein at least one targeted message is transmitted utilizing: at least one mobile phone, at least one smart phone, at least one personal digital assistant, at least one desktop computer, at least one laptop computer, at least one tablet computer, or at least one touch pad device, or any combination thereof.

11. The method of claim 1, further comprising: processing information related to receiving at least one request from at least one device of at least one traveler for itinerary information of the at least one traveler is made: after the at least one device has been notified from at least one computer that the at least one device should request the itinerary information; after the at least one device requests the itinerary information; or after the itinerary information is sent to the at least one device; or any combination thereof.

12. The method of claim 1, wherein at least one targeted message comprises: at least one offer for at least one product; at least one offer for at least one service; or information about at least one event; or any combination thereof.

13. The method of claim 1, wherein at least one device caches at least one targeted message for at least one future event.

14. The method of claim 1, wherein at least one device can receive targeted messages, and information regarding when to display or not display the targeted messages.

15. The method of claim 1, wherein at least one targeted message provides at least one link to at least one application programming interface (API) and/or at least one web site.

16. The method of claim 1, wherein at least one targeted message is generated by retrieving information from at least one application programming interface and/or at least one database.

17. The method of claim 2, wherein the traveler preference information comprises: preference information entered by the at least one traveler and/or for the at least one traveler; or preference information guessed for the at least one traveler by using information derived from similar travelers.

18. A computer-implemented system for targeting messages to at least one traveler, comprising:

at least one processor configured for:

receiving a request, from at least one merchant to transmit messages to at least one device of at least one traveler based on the current or future location of that traveler and a categorization of the traveler;

determining, by the computer, location information of the at least one traveler, the location information comprising current location information of the at least one traveler based on the device location and projected location information of the at least one traveler during at least one giving time period, the determining comprising extracting at least a portion of the location information from itinerary information received from multiple electronic sources;

determining, by the computer, prior expense report information related to where the at least one traveler has been previously, the prior expense report information comprising: average number of guest the at least one traveler entertains when traveling, average amount a traveler spends on products/services, and allowance a traveler is given for products and/or services;

determining, by the computer, entity expense policy for the at least one traveler, the entity expense policy comprising information related to policies an entity has regarding reimbursable traveler expenses and/or preferable expense providers;

categorizing, by the computer, the location information, the prior expense information, and the entity expense policy information into at least one category, the categorizing comprising generating a projected route based on the location information and analyzing the prior expense information and the entity expense policy information to identify at least one offer of interest;

wherein the generating of the projected route comprises:

searching the itinerary information to determine which travelers will be traveling to a destination of interest;

searching an expense database and a travel reservation database at predetermined times to determine if any travelers are leaving for the destination of interest within a predetermined amount of time; and creating, using the itinerary route mapping module, travel maps for travelers with itineraries that have the traveler leaving for the destination of interest within the predetermined amount of time, and to determine traveler interests based on the prior expense report information, the searching performed using filtering accounting for: the average number of guest the at least one traveler entertains when traveling, the average amount a traveler spends on products/services, and the allowance a traveler is given for products and/or services;

matching, by the computer, the at least one category for the location information, the prior expense information, and the policy information against at least one category for available targeted messages to determine if there are any matches, the matching comprising comparing the projected route and the at least one offer of interest to a plurality of offers applying to the at least one category; and in response to obtaining data from the location module of the at least one device indicating that the at least one device is in a location corresponding to the projected location information, transmitting to the at least one device of the at least one traveler any targeted messages that have at least one category that matches at least one category for the location information, the prior expense information, and the policy information to at least one device of the at least one traveler, wherein the location information, the prior expense information, and the policy information is utilized to help determine what products and/or services the at least one traveler is likely to purchase when traveling.

19. The system of claim 18, further comprising receiving traveler preference information and using the traveler preference information to determine what available targeted messages are of interest to the at least one traveler.

20. The system of claim 18, wherein the at least one processor is further configured for processing information related to collecting at least one fee from at least one merchant for transmitting the at least one targeted message to the at least one traveler.

21. The system of claim 18, wherein the at least one processor is further configured for processing information related to collecting at least one fee from at least one merchant when the at least one traveler acts upon at least one targeted message.

22. The system of claim 18, the at least one processor is further configured for processing information associated with storing information associated with any purchase of at least one good and/or the at least one service by the at least one traveler.

23. The system of claim 22, wherein the at least one processor is further configured for processing information associated with auditing expense reporting information for the at least one traveler to know whether or not the at least one good and/or the at least one service was purchased.

24. The system of claim 18, wherein the location information also comprises global positioning system (GPS) information.

25. The system of claim 18, wherein multiple matches are found and multiple targeted messages are transmitted in a prioritized manner.

26. The system of claim 18, wherein only targeted messages that offer at least one product and/or at least one service that complies with at least one traveler's entity's policies are transmitted.

27. The system of claim 18, wherein at least one targeted message is transmitted utilizing: at least one mobile phone, at least one smart phone, at least one personal digital assistant, at least one desktop computer, at least one laptop computer, at least one tablet computer, or at least one touch pad device, or any combination thereof.

28. The system of claim 18, wherein the at least one processor is further configured for processing information related to receiving at least one request from at least one device of at least one traveler for itinerary information is made: after the at least one device has been notified from at least one computer that the at least one device should request the itinerary information; after the at least one device requests the itinerary information; or after the itinerary information is sent to the at least one device; or any combination thereof.

29. The system of claim 18, wherein at least one targeted message comprises: at least one offer for at least one product; at least one offer for at least one service; or information about at least one event; or any combination thereof.

30. The system of claim 18, wherein the at least one device caches at least one targeted message for at least one future event.

31. The system of claim 18, wherein the at least one device can receive targeted messages, and information regarding when to display or not display the targeted messages.

32. The system of claim 18, wherein the at least one targeted message provides at least one link to at least one application programming interface (API) and/or at least one web site.

33. The system of claim 18, wherein the at least one targeted message is generated by retrieving information from at least one application programming interface and/or at least one database.

34. The system of claim 19, wherein the traveler preference information comprises: preference information entered by the at least one traveler and/or for the at least one traveler; or preference information guessed for the at least one traveler by using information derived from similar travelers.

* * * * *